(12) United States Patent
Surve et al.

(10) Patent No.: US 6,591,008 B1
(45) Date of Patent: Jul. 8, 2003

(54) METHOD AND APPARATUS FOR DISPLAYING PICTORIAL IMAGES TO INDIVIDUALS WHO HAVE IMPAIRED COLOR AND/OR SPATIAL VISION

(75) Inventors: Swatee N. Surve, Rochester, NY (US); Thomas M. Stephany, Churchville, NY (US); Elaine W. Jin, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 441 days.

(21) Appl. No.: 09/602,728

(22) Filed: Jun. 26, 2000

(51) Int. Cl.⁷ .................................................. G06K 9/00
(52) U.S. Cl. ...................... 382/162; 382/167; 382/274; 348/62
(58) Field of Search ................................. 382/162, 167, 382/274, 114, 118, 191, 260; 348/62; 345/729, 518, 589, 617

(56) References Cited

U.S. PATENT DOCUMENTS 5,267,331 A   11/1993   Siwoff
5,461,399 A  * 10/1995  Cragun ........................ 345/729
5,467,123 A   11/1995   Zeevi et al.
6,362,830 B1 *  3/2002  Walraven ...................... 348/62

OTHER PUBLICATIONS

Peli et al, "Digital Image Enhancement for the Visually Imapared: Simulations and Results", 1989, IEEE pp. 45–46.*

* cited by examiner

Primary Examiner—Phuoc Tran
(74) Attorney, Agent, or Firm—Thomas H. Close

(57) ABSTRACT

A method for displaying a digital color image to a visually impaired person, includes the steps of: measuring the visual response of the person and specifying a set of enhancement profiles relating to the person's color and spatial frequency visual perception, adjusting the color content of the digital color image in response to a color content enhancement profile; adjusting the spatial frequency content of the image in response to a spatial frequency profile; adjusting the contrast of the image in response to a contrast adjustment profile; and displaying the adjusted digital image to the person.

21 Claims, 5 Drawing Sheets

METHOD AND APPARATUS FOR DISPLAYING PICTORIAL IMAGES TO INDIVIDUALS WHO HAVE IMPAIRED COLOR AND/OR SPATIAL VISION

FIELD OF THE INVENTION

This invention relates to the field of display devices and particularly to the methods and apparatus for the improvement of color and spatial discrimination of pictorial images for viewers with vision impairment.

BACKGROUND OF THE INVENTION

At present, when a person wants to view a photographic print he simply picks it up and looks at it. However, a person with a visual impairment cannot fully participate in the pleasure of photography due to their lack of visual acuity. The visual shortcomings of these people are partially addressed in U.S. Pat. No. 5,267,331 by Siwoff issued Nov. 30, 1993, entitled Digitally Enhanced Imager for the Visually Impaired, wherein a device is described which scans a page of text and creates a high resolution, high contrast image which is displayed upon a high resolution monitor. This enhancement of text eliminates any "gray" transitions between the text and the background thereby improving resolution. However this process is not applied to pictorial images because it does not improve the appearance of the pictorial image for a person with visual impairment. Also, U.S. Pat. No. 5,467,123 issued Nov. 14, 1995 to Zeevi et al., entitled Apparatus & Method for Enhancing Color Images discloses a color image apparatus comprising apparatus for receiving signals representing a color image, image processing apparatus, and display device for displaying the processed signal. The image signal is processed to improve the appearance of the image for viewers who are color blind. The image processing extracts information that cannot be detected by the user (ex. yellow-blue signals) and adds the extracted information to a channel the user can detect (ex. red-green) thus enhancing their visual discrimination. This approach renders an image that appears extremely unnatural to any viewer, including a viewer that is color blind. There is a need, therefore, for an improved method and apparatus for displaying pictorial images to individuals who have impaired color and/or spatial discrimination.

SUMMARY OF THE INVENTION

The present invention meets the need by providing a method for displaying a digital color image to a visually impaired person that includes the steps of: measuring the visual response of the person and specifying a set of enhancement profiles relating to the person's color and spatial frequency visual perception, adjusting the color content of the digital color image in response to a color content enhancement profile; adjusting the spatial frequency content of the image in response to a spatial frequency profile; adjusting the contrast of the image in response to a contrast adjustment profile; and displaying the adjusted digital image to the person.

This method and display apparatus, which will be explained in full detail below, enables a visually impaired person to take any image, whether digital or hardcopy, enhance that image according to a measured profile, and output that image to either a monitor or a hard copy output device. This method has a distinct cost and logistical advantage. Rather than producing customized output such as photographs for each visually impaired person, the photograph is simply placed into a reader and either viewed or printed out. Additionally, when compared to the image processing disclosed in U.S. Pat. No. 5,467,123, the present invention produces a more natural looking image with enhanced discrimination.

DETAILED DESCRIPTION OF THE INVENTION

Figure 1:
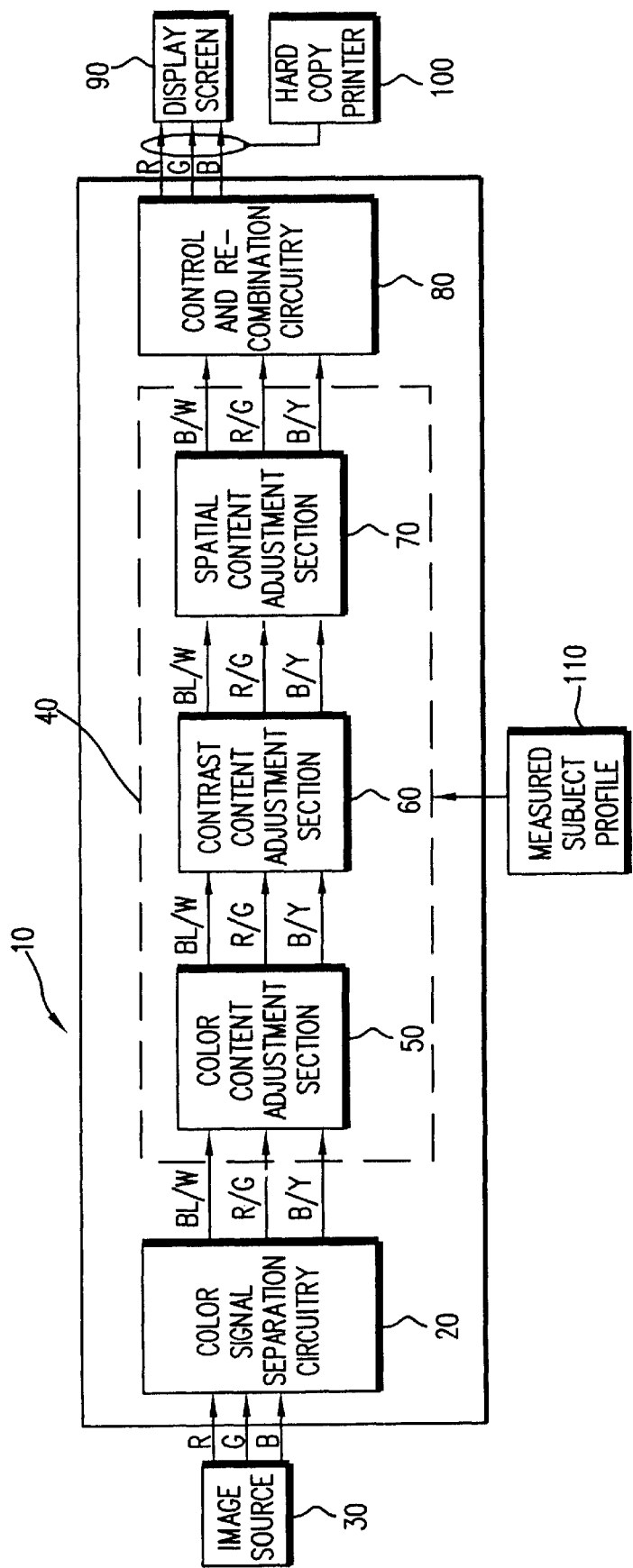
FIG. 1 is a block diagram showing apparatus for practicing the method of the present invention.

Referencing first to FIG. 1, an image reading device 10 constructed and operative in accordance with the present invention, includes a color signal separation circuit 20 whose function is to separate the color channels from an image source 30 so that individual components are ready for the next step of image adjustment. These signals are separated into a luminance and two chrominance described as Red/Green, Blue/Yellow, and Black/White, and are indicated in the figure as R/G, B/Y, and BL/W.

An enhancement module 40 includes a color content section 50, a contrast content adjustment section 60, and a spatial content adjustment section 70. These adjustments within enhancement module 40 of color section 50, contrast section 60, and spatial content section 70 occur sequentially but the order and number of adjustments can be different based on the application.

After the adjustments have been made to the signals, they are sent to control and recombination circuitry 80 where they are recombined into an R, G, B signal, which are in turn output to a display screen 90 or a hard copy printer 100. The display screen 90 can be for example a television receiver, a computer monitor, a personal digital assistant, an electronic picture frame, a data display, or a control panel. The apparatus detailed in FIG. 1 could be implemented either by a software programmed personal computer or by a hardware programmed ASIC device such as those produced by Texas Instruments Corporation, Dallas Tex., wherein specific needs at the time of production would determine specific device part numbers.

A measured subject profile 110 is determined by measuring the visual responses and preferences of the user. This measured subject profile 110 is employed to selectively modify the gain or attenuation in sections 50, 60 and 70, thus rendering a pictorial image with more useable information for a person who has impaired color and/or spatial discrimination. The measurement of a users visual response is accomplished by displaying first a series of color patterns to the user, and based upon the user's responses, a color discrimination characteristic of the user is derived. Secondly, a series of sinusoidal grayscale gratings are displayed to the user and based upon the responses, a luminance discrimination characteristic is measured. Lastly, the preference measurement is accomplished by displaying a series of images with different color saturation, color balance, and tone scale curves. The user will then be asked to indicate which images he/she prefers. The format of the subject profile consists of a series of numbers representing the aforementioned user preferences associated with a particular scene content. These numerical values represent the gain factors for color content adjustment section 50, contrast adjustment section 60, and spatial content adjustment section 70 which are detailed in FIG. 1.

Figure 2:
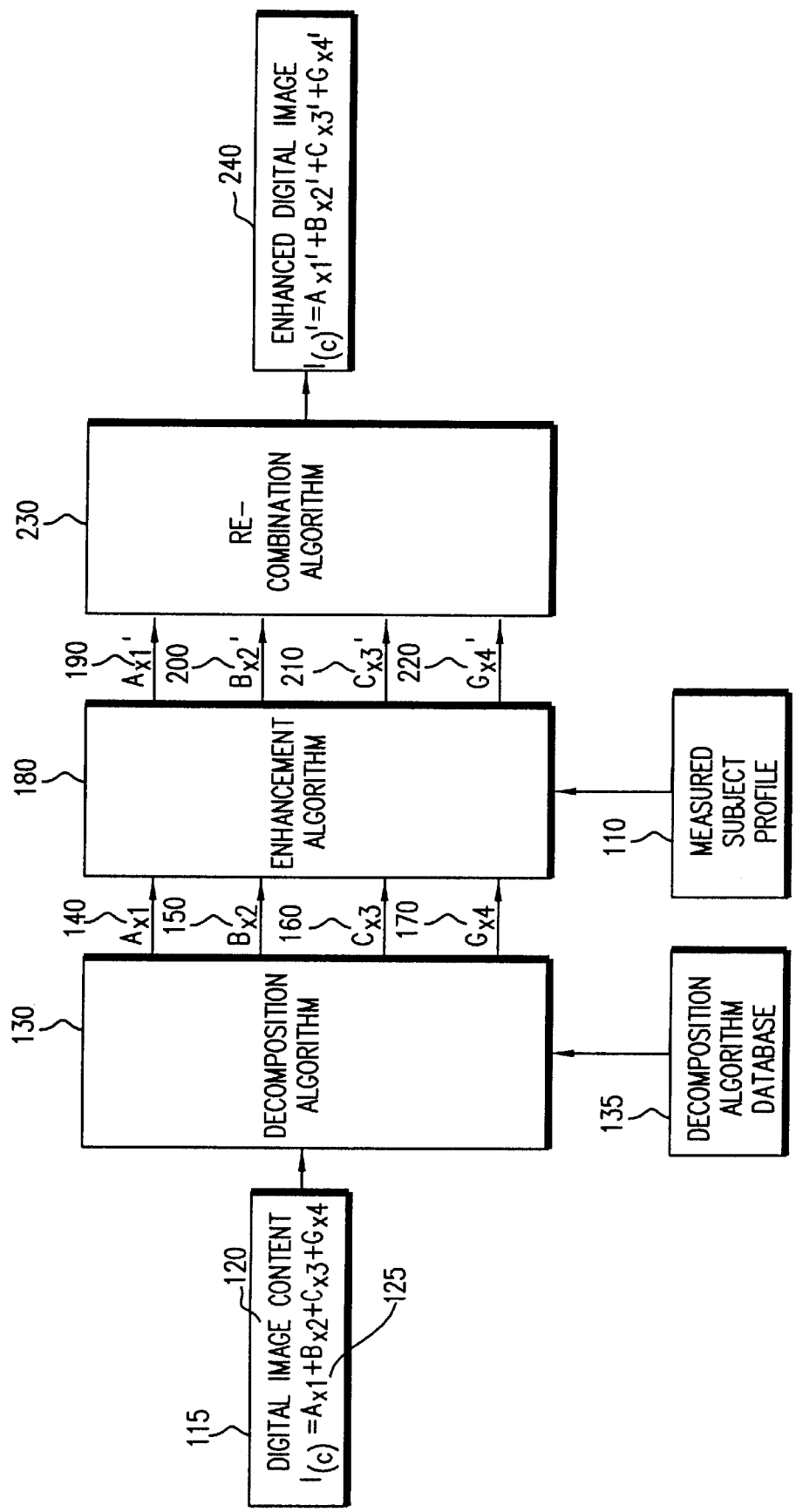
FIG. 2 is a diagram useful in explaining the image processing algorithm used in the present invention.

Referring now to FIG. 2, the enhancement algorithms that are used in the present invention will be described in more detail. The digital image 115 is comprised of digital image content 120 and represented by equation 125 which is written as $I_{(c)}A_{x1}+B_{x2}+C_{x3}+G_{x4}$. $I_{(c)}$ is the representation of the image components where $A_{x1}$ represents the color content of the image, $B_{x2}$ represents the spatial content of the image, $C_{x3}$ represents the mid-tone contrast of the image, and $G_{x4}$ represents other relevant content characteristics of the image such as tone scale.

The digital image 115 is fed to decomposition algorithm 130 which in turn separates the digital image 115 into it's constituent attributes 140, 150, 160, and 170. Attribute 140 represents the color content of the image, attribute 150 represents the spatial content of the image (for example, the spatial content of the image can be represented as a spatial frequency profile specified by a plurality of spatial frequency band pass filters), attribute 160 represents the mid-tone contrast content of the image, and attribute 170 represents other relevant content characteristics of the image such as tone scale.

Depending on the individual steps of the adjustments, the decomposition of the image will use different algorithms, stored in decomposition algorithm database 135, and occurs sequentially within decomposition algorithm box 130. This step is repeated for each individual attribute.

For each individual attribute, these components are modified by enhancement algorithm 180 that changes the characteristics of attributes 140, 150, 160, and 170 according to the subject profile 110. For example, the characteristic of the color content is saturation and this value is attenuated or amplified. Similar operations will occur for the other attributes. Once the enhancement algorithm 180 is applied, the enhanced attributes 190, 200, 210, and 220 are recombined by adding them together in recombination algorithm 230 that produces the enhanced digital image $I_{(c)}'$ 240 which is represented as follows:

$$I_{(c)}'=A_{x1}'+B_{x2}'+C_{x3}'+G_{x4}'$$

Figure 3:
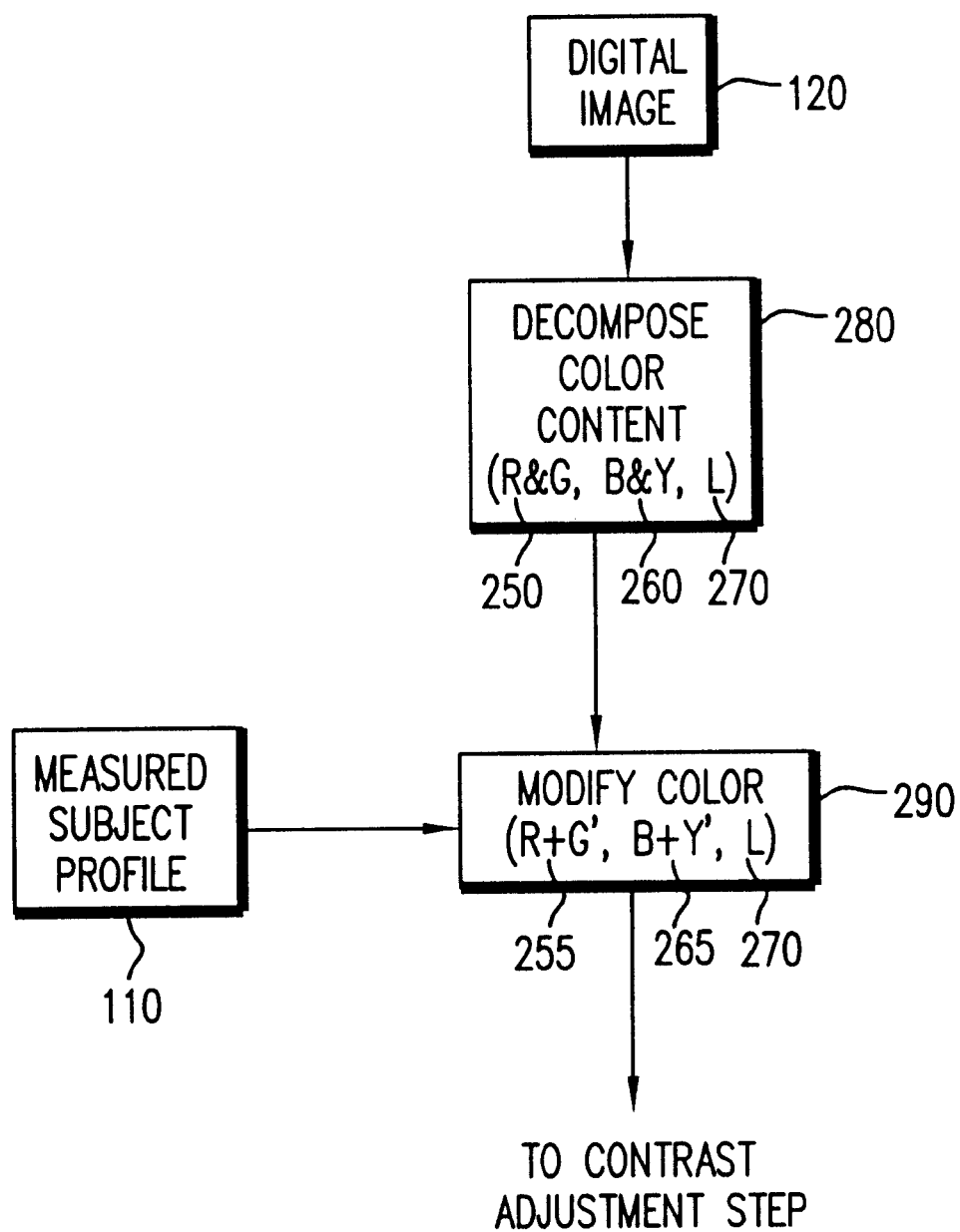
FIG. 3 is a flowchart showing the steps of adjusting of color content of an image according to the present invention.

FIG. 3 further describes the decomposition of color content in the digital image 120. The digital image 120 is decomposed into its respective color components of Red/Green 250, Blue/Yellow 260, and luminance 270 signals. The decomposition algorithm 280 includes components 250, 260, and 270. Decomposition algorithm 280 is one step in the decomposition algorithm 130, as shown in FIG. 2, which complements color signal separation circuit 20 as shown in FIG. 1.

Modification algorithm 290 modifies color components 250 and 260 according to the measured subject profile 110. Mathematical operations within modification algorithm 290 are either amplification or attenuation of color signals Red/Green 250 and Blue/Yellow 260 according to the parameters defined in the measured subject profile 110. The profile 110 is determined by comparing the subject's response to that of an average normal observer and the difference between these two responses determines the gains for the enhancement algorithm 180. The resulting output of modification algorithm 290 is enhanced Red/Green' 255, Blue/Yellow' 265 and unmodified luminance 270.

Figure 4:
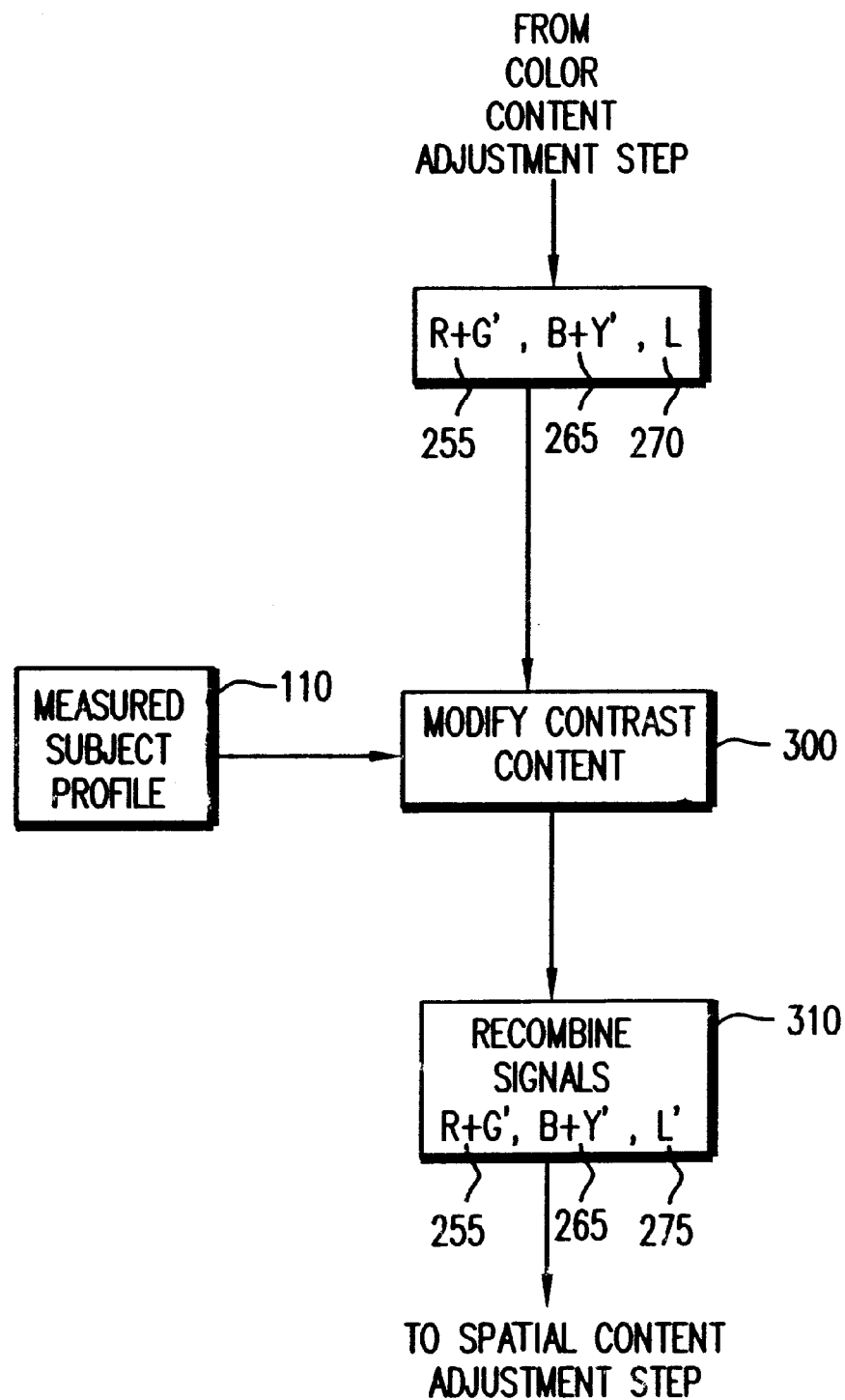
FIG. 4 is a flowchart showing the steps of adjusting the contrast content of an image according to the present invention.
Figure 5:
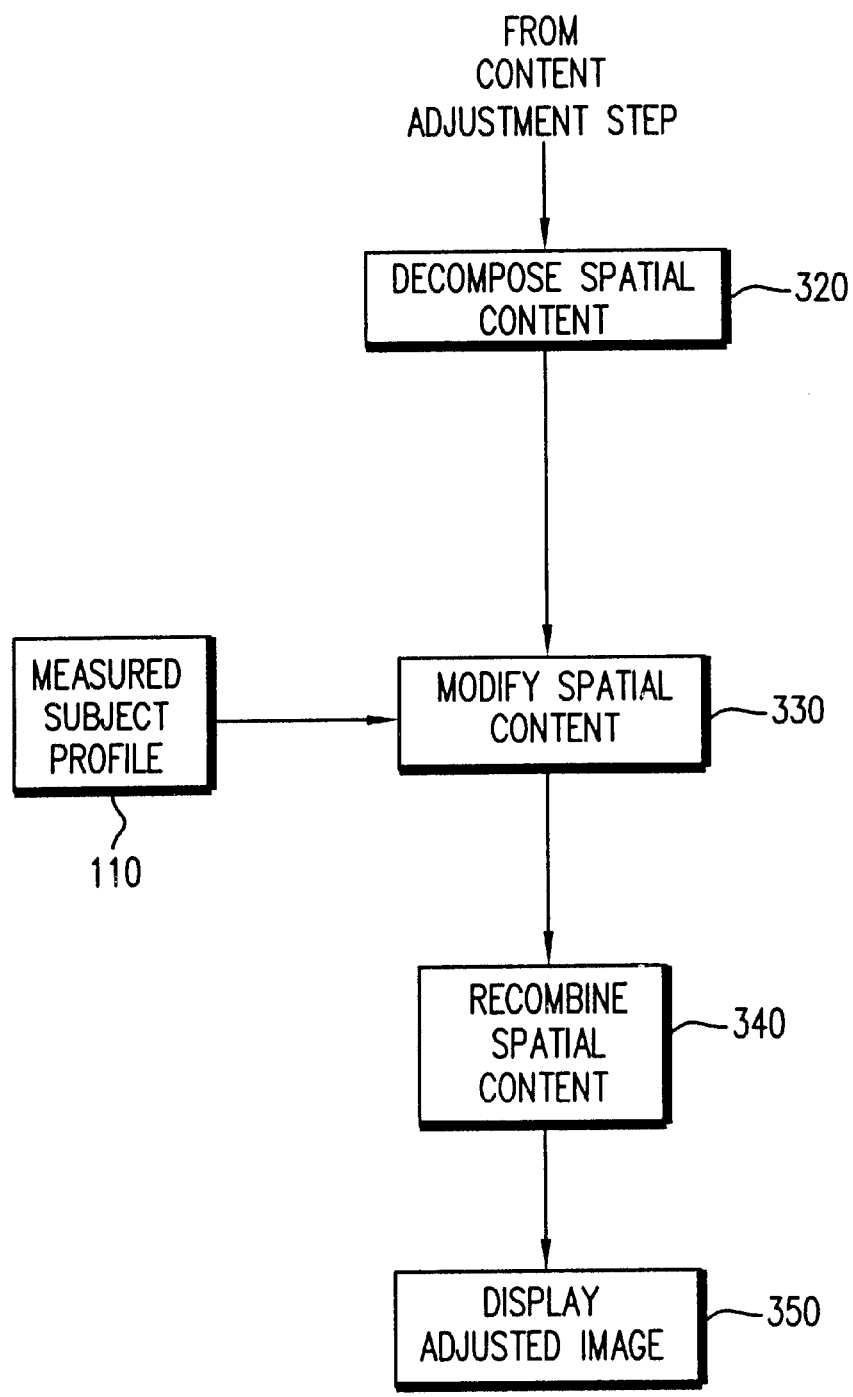
FIG. 5 is a flowchart showing the steps of adjusting the spatial frequency content according to the present invention.

Referring now to FIG. 4, the contrast is adjusted using algorithm 300 according to the contrast parameters defined in measured subject profile 110. Unmodified luminance 270 is adjusted with contrast modification algorithm 300. The luminance value in profile 110 is determined by comparing the subject's response to that of an average normal observer and the difference between these two responses determines the gain for the enhancement algorithm 180. This value could also be determined by the user's preference. Once the modifications are complete, the color contents 255 and 265 along with modified luminance content 275 is recombined using algorithm 310 and sent to the spatial frequency adjustment step illustrated in FIG. 5.

Decomposing the spatial content of the digital image 120 occurs in step 320 by using either a standard fast Fourier transform function or a standard discrete cosine transform. Both these functions are well known to those skilled in the art. The measured subject profile 110 includes a spatial content parameter that is determined by measuring the contrast sensitivity function of the subject. The contrast sensitivity function of the subject is measured by the sinusoidal grayscale grating method described previously. The spatial content attributes are modified in step 330 based on the measured subject profile 110. The spatial content value in profile 110 is determined by comparing the subject's response to that of an average normal observer and the difference between these two responses determines the gain for the enhancement algorithm 180. The modified signal is then sent to 340 for recombination and the adjusted image 350 is displayed. It should be noted that recombination signals step 310, shown in FIG. 4, recombination algorithm 230 shown in FIG. 2, and recombination circuitry 80 shown in FIG. 1 are the same step. FIG. 1 is a hardware step; FIG. 2 could be either a software or hardware step; FIG. 4 could be either a software or hardware step.

In addition, the subject's visual response for different subject matter can be measured, and the digital image adjusted according to the subject matter contained in the digital image. For example, the individuals response to scenes containing human faces and scenes not containing human faces can be measured, and when there is a difference in response, the scenes can be modified accordingly.

The invention has been described in detail with particular reference to certain preferred embodiments thereof, but it will be understood that variations and modifications can be effected within the spirit and scope of the invention.

PARTS LIST 10 image reading device
20 color signal separation circuit
30 image source
40 enhancement module
50 color section
60 contrast section
70 content section
80 recombination circuitry
90 display screen
100 hard copy printer
110 measured subject profile
115 digital image
120 image content
125 equation
130 decomposition algorithm
135 database
140 color content attribute 150 spatial content attribute
160 mid-tone contrast attribute
170 other relevant characteristic attribute
180 enhancement algorithm
190 enhanced color content attribute
200 enhanced spatial content attribute
210 enhanced mid-tone contrast attribute
220 enhanced other relevant characteristic attribute
230 recombination algorithm
240 enhanced digital image
250 Red/Green color component
255 enhanced Red/Green
260 Blue/Yellow color component
265 enhanced Blue/Yellow
270 luminance signal
275 modified luminance content
280 decomposition algorithm
290 modification algorithm
300 contrast adjustment algorithm
310 recombination algorithm
320 spatial decomposition step
330 modify spatial content step
340 sent modified signal step
350 adjusted image

What is claimed is:

1. A method for displaying a digital color image to a visually impaired person, comprising the steps of:
   a) measuring the visual response of the person and specifying a set of enhancement profiles relating to the person's color and spatial frequency visual perception,
   b) adjusting the color content of the digital color image in response to a color content enhancement profile;
   c) adjusting the spatial frequency content of the image in response to a spatial frequency profile;
   d) adjusting the contrast of the image in response to a contrast adjustment profile; and
   e) displaying the adjusted digital image to the person.

2. The method claimed in claim 1, further comprising the steps of measuring the person's visual response for different subject matter, and adjusting the digital image according to the subject matter contained in the digital image.

3. The method claimed in claim 2, wherein the subject matter includes scenes containing human faces and scenes not containing human faces.

4. The method claimed in claim 1, wherein the spatial frequency profile specifies a plurality of spatial frequency band pass filters.

5. The method claimed in claim 1 wherein the display is a television receiver.

6. The method claimed in claim 1 wherein the display is a computer monitor.

7. The method claimed in claim 1, wherein the display is a personal digital assistant.

8. The method claimed in claim 1, wherein the display is an electronic picture frame.

9. The method claimed in claim 1, wherein the display is a data display.

10. The method claimed in claim 1, wherein the display is a control panel.

11. Apparatus for displaying a digital color image to a visually impaired person, comprising:
    a) means responsive to a personal color content enhancement profile for adjusting the color content of the digital color image;
    b) means responsive to a personal spatial frequency enhancement profile for adjusting the spatial frequency content of the digital color image;
    c) means responsive to a contrast adjustment profile for adjusting the contrast of the digital color image; and
    d) a display for displaying the adjusted digital color image to the person.

12. The apparatus claimed in claim 11, further including means for adjusting the digital color image according to subject matter categories contained in the digital color image.

13. The apparatus claimed in claim 12, wherein the subject matter categories includes scenes containing human faces and scenes not containing human faces.

14. The apparatus claimed in claim 11, wherein the spatial frequency profile specifies a plurality of spatial frequency band pass filters.

15. The apparatus claimed in claim 11 wherein the display is a television receiver.

16. The apparatus claimed in claim 11 wherein the display is a computer monitor.

17. The apparatus claimed in claim 11, wherein the display is a personal digital assistant.

18. The apparatus claimed in claim 11, wherein the display is an electronic picture frame.

19. The apparatus claimed in claim 11, wherein the display is a data display.

20. The apparatus claimed in claim 11, wherein the display is a control panel.

21. A computer storage medium having instruction stored therein for causing a computer to perform the method of claim 1.

* * * * *